(12) United States Patent
Everett

(10) Patent No.: US 6,182,990 B1
(45) Date of Patent: Feb. 6, 2001

(54) FOLDING TRAILER FOR A BICYCLE

(76) Inventor: Richard C. Everett, 225 Sunshine La., West Linn, OR (US) 97068

(*) Notice: Under 35 U.S.C. 154(b), the term of this patent shall be extended for 0 days.

(21) Appl. No.: 09/266,358

(22) Filed: Mar. 11, 1999

(51) Int. Cl.[7] .............................. B62K 27/00; B62D 63/00
(52) U.S. Cl. ........................ 280/204; 280/292; 280/401; 280/491.1; 280/491.4
(58) Field of Search .................................. 280/204, 292, 280/401, 415.1, 491.1, 491.4

(56) References Cited

U.S. PATENT DOCUMENTS

| | | | |
|---|---|---|---|
| 5,054,800 | * 10/1991 | Christensen et al. | 208/204 |
| 5,454,577 | * 10/1995 | Bell | 280/204 |
| 5,454,578 | * 10/1995 | Neack | 280/292 |
| 5,669,618 | * 9/1997 | Chiu | 280/292 |
| 5,785,333 | * 7/1998 | Hinkston et al. | 280/204 |
| 5,785,334 | * 7/1998 | Robinson | 280/204 |
| 5,829,771 | * 11/1998 | Hsu | 280/292 |
| 5,921,571 | * 7/1999 | Bell | 280/204 |

* cited by examiner

*Primary Examiner*—Brian L. Johnson
*Assistant Examiner*—Matthew Luby
(74) *Attorney, Agent, or Firm*—Edward E. Roberts

(57) ABSTRACT

A stable lightweight cargo trailer for a bicycle with a demountable bicycle type wheel having a collapsible frame assembly, the trailer including an upper elongate frame member defining an upper limit of a cargo compartment and a lower frame member having a portion defining a lower limit of the cargo compartment, the upper frame member and the lower frame portion being pivotally connected by intermediate end and side members such that the upper frame member is foldable from an extended position to a collapsed position allowing the upper frame member to collapse to overly said lower frame member into a compact configuration.

23 Claims, 3 Drawing Sheets

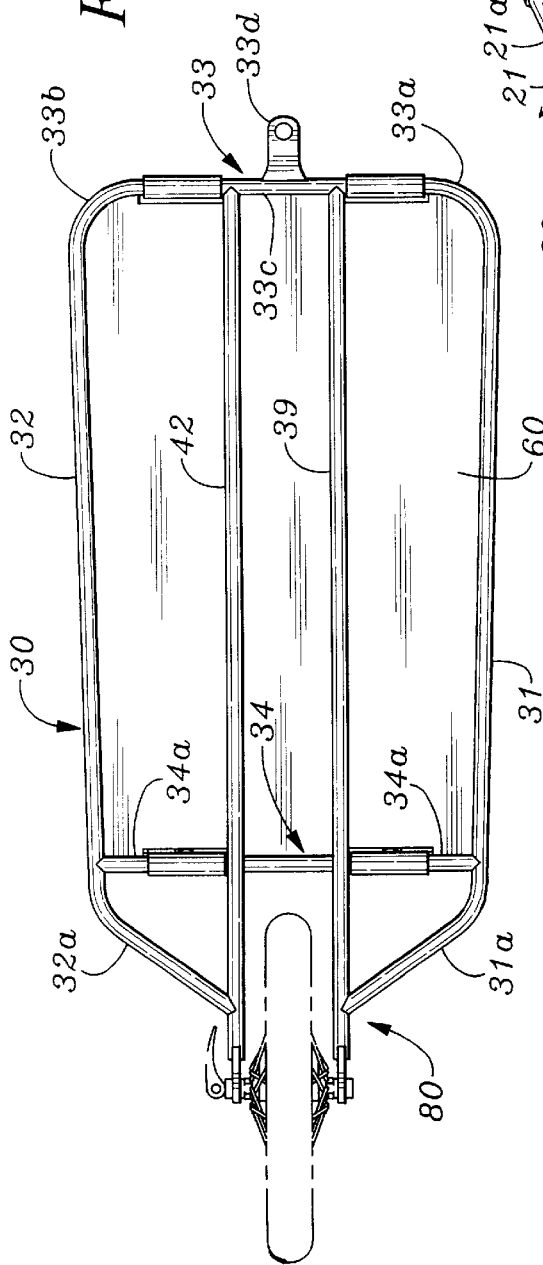
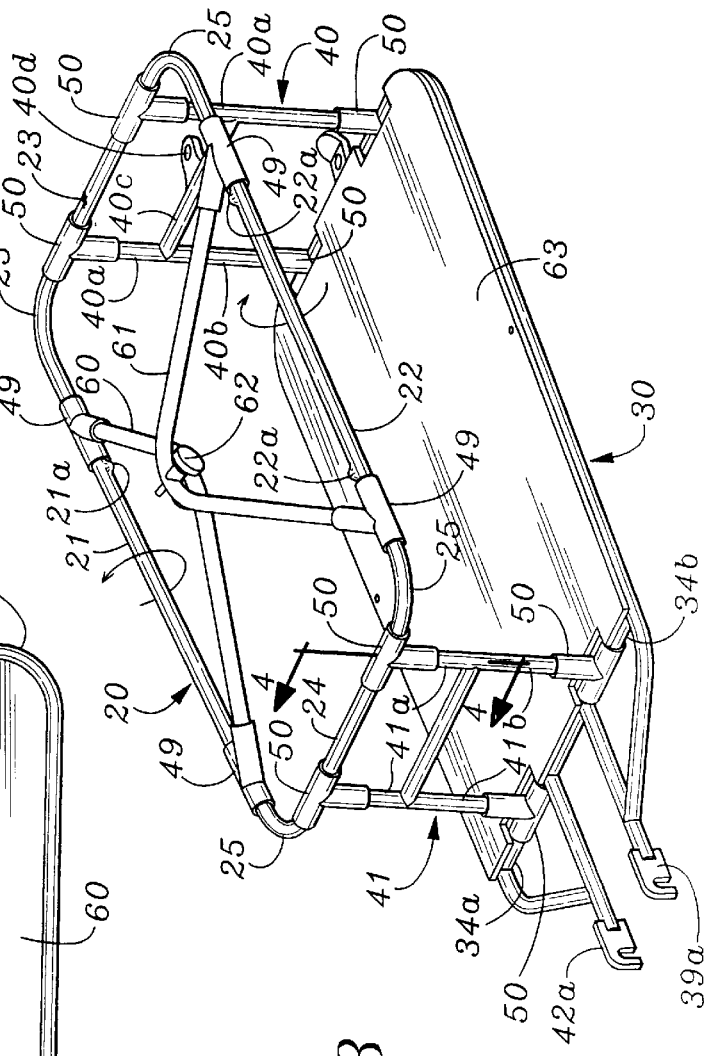

FOLDING TRAILER FOR A BICYCLE

BACKGROUND OF THE INVENTION

The background of the invention will be discussed in two parts.

1. Field of the Invention

This invention relates to trailers for bicycles, and more particularly to a single wheel bicycle towed trailer assembly, which trailer is lightweight and collapsible for storage or transportation.

2. Description of the Prior Art

Trailers for use with bicycles are well known in the art. There are many varieties of such trailers, which have taken many forms. In some such trailers, infant or toddler carrying vehicles have generally taken the form of two-wheeled trailers configured with a conventionally seating area for the occupant. Other such devices are configured for transportation of miscellaneous cargo as may be desired by the bicycle rider. Whether configured for carrying small children or transporting cargo, such trailers are usually designed for towing behind the bicycle and attachable in some manner to the rear wheel of the bicycle.

In accordance with an aspect of the invention, there is provided a trailer towable from the rear wheel of a bicycle for transporting cargo, the trailer having a removable single wheel and a collapsible foldable frame for ease of storage or transportation.

SUMMARY OF THE INVENTION

According to a broad aspect of the invention there is provided a compact, stable and lightweight trailer, configured and dimensioned to define a cargo enclosure, for attachment to the rear wheel of a bicycle and having a collapsible, or folding frame assembly. The frame assembly comprises a primary structural tubular frame assembly including an upper continuous generally rectangular frame member, a lower frame member having a continuous generally rectangular portion, a front and a rear H-shaped support frame formed of first and second upright articulated tubes with an interconnecting cross-bar pivotably coupled intermediate the upper and lower frame members at the front and rear thereof, left and right side folding support frame units pivotally coupled at the tops thereof to the left and right side, respectively, of the upper frame member and releasably connected at the bottoms thereof to the left and right side, respectively, of the lower frame member, and a lower base or floor member, all of which cooperatively define the cargo enclosure.

The front and rear support frame units are pivotally coupled to both the upper and lower frame members whereas the side units are pivotally coupled to the upper frame member and releasably connected to the lower frame member by suitable releasable couplers for enabling captive, yet releasable retention of the two side frame units. Upon release of the releasable couplers, the upper frame member folds rearwardly to collapse onto the lower frame member.

Also included is a pair of generally parallel fork members extending from the rear of the generally rectangular portion of the lower frame unit for supporting a removable wheel having a pneumatic tire, and a horizontally pivotable hitch arm assembly attached at the front of the primary frame assembly for attachment to the rear wheel of a bicycle.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 2 is a bottom plan view of the collapsible trailer of FIG. 1 with the hitch arms removed and the trailer wheel and wheel mounting shown in phantom;

FIG. 3 is a perspective view of the trailer of FIG. 1 with the hitch arms and trailer wheel removed and showing the tubular sides of the trailer rotated to the folding position;

DESCRIPTION OF THE PREFERRED EMBODIMENT

Figure 1:
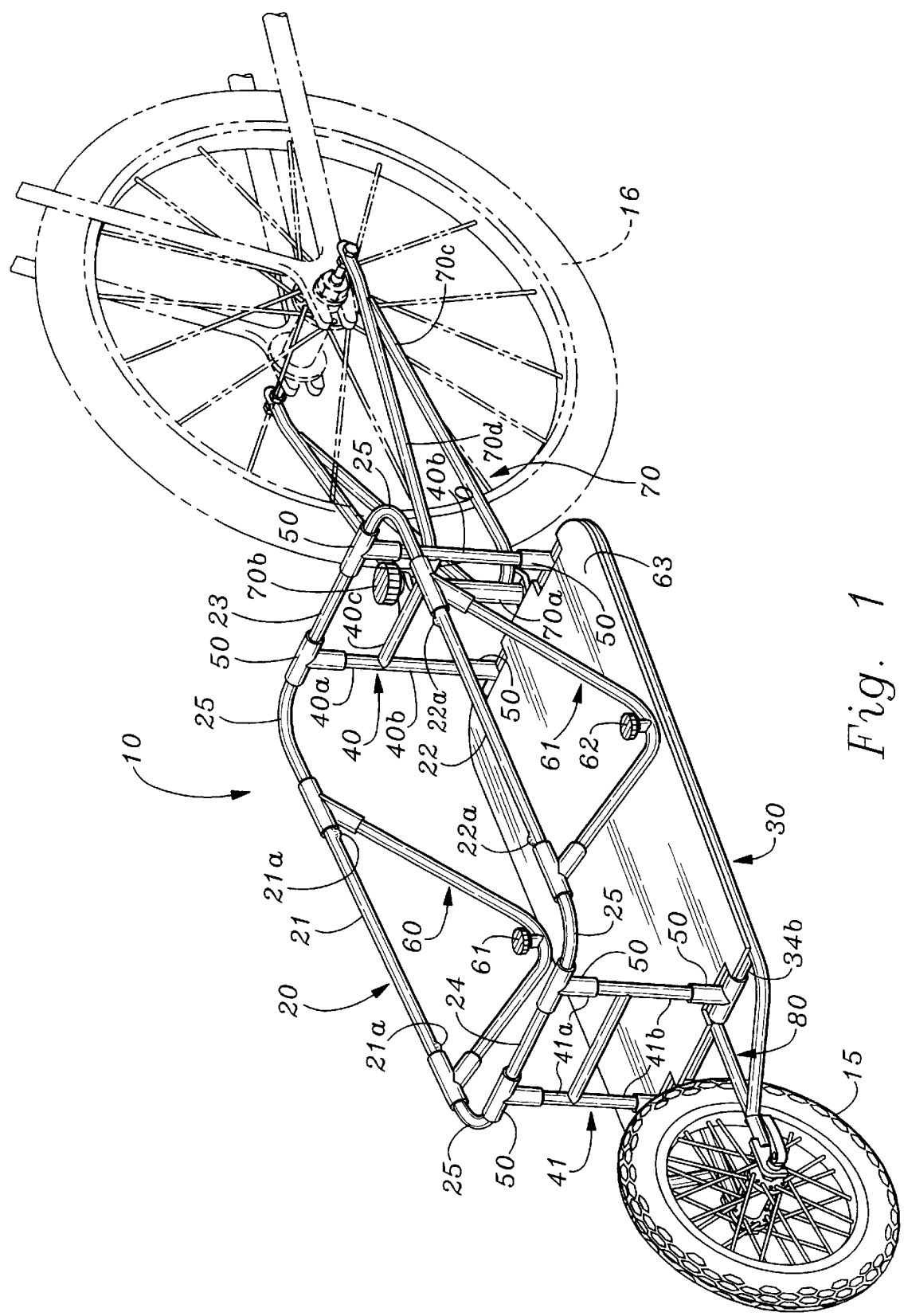
FIG. 1 is a perspective view of the collapsible folding trailer according to the invention with the bicycle wheel and mounting shown in phantom.

As shown particularly in FIGS. 1 and 2, the trailer of the present invention, generally designated 10, comprises an upper continuous frame member 20, a lower frame member 30, front and rear folding frame members 40 and 41, left and right side folding frame members 60 and 61, and flooring 63. As will be described, the upper frame member folds rearwardly to collapse onto the lower frame member. The trailer further comprises pivotable hitch assembly 70, and demountable trailer wheel 15. Bicycle rear wheel 16 is shown in phantom.

Trailer 10 is configured for towing behind a bicycle in transport of general cargo. The framing structure assembly is configured of generally rigid lightweight tubular material, such as aluminum, and along with flooring 63, forms a floored enclosure configured and dimensioned for generally surrounding and receiving therein the desired cargo. Although the trailer is intended for transport of general cargo, it could conveniently be employed otherwise, such as for transport of a pet as an occupant.

The upper part of the cargo compartment is defined by upper frame member 20. Upper frame member 20 is planar, continuous, rigid and generally rectangular in configuration. It comprises a pair of substantially identical side rails 21, 22 and substantially identical end rails 23, 24, formed continuously with the corners 25 of the rectangular configuration being rounded.

Lower frame member 30, along with flooring 63, defines the lower portion of the cargo compartment. As best shown in FIG. 2, the lower framework 30 has a continuous rigid frame including a generally rectangular portion for supporting flooring 63, and a fork assembly 80 for supporting the demountable, or removable, wheel.

The generally rectangular portion of lower frame 30 includes substantially identical side members 31, 32, front end member 33, and a rear cross piece 34 intermediate members 31, 32. End member 33c includes a first connector means, such as apertured stub 33d, for attachment of hitch assembly 70.

A pair of identical parallel members 39, 42 run continuously the length of the generally rectangular portion and extend rearwardly therefrom to form a fork assembly for supporting the demountable wheel 15. Members 31 and 32 extend from the generally rectangular portion and are curved to connect to members 39, 42, respectively, thereby providing support arms, designated 31a, 32a, for the fork assembly. The ends of parallel members 39, 42 include wheel attachment means such as axle-receiving stub members 39a, 42a.

Side folding support members 60, 61 are substantially identical and pivotally connected to side rail portions 21, 22, respectively, by substantially identical angle-shaped clamps 49, and releasably secured by suitable releasable couplers 62, such as thumb screws, to flooring 63 and lower frame portions 31, 32 respectively. Each side member is comprised of a length of tubing bent into a generally right angle configuration having a rounded right angle portion and substantially equal adjacent sides, or legs. The rounded right angle portion is connected at its center thereof by couplers 62 to flooring 63 and the adjacent legs are pivotally connected at the ends thereof by angle-shaped clamps 49 to its respective side rail portions 21,22. Side members 60, 61 are restrained from sliding longitudinally on rails 21, 22, by appropriate stops such as welded beads 21a, 22a. The configuration of angle-shaped clamps 49 is discussed in more detail hereinbelow.

H-shaped front folding support frame 40 is pivotally coupled intermediate upper frame member 20 and lower frame 30, and includes a main support formed of first and second upright side tubes with an interconnecting cross-bar. The top two free arms 40a of the side tubes are pivotally connected by T-shaped clamps 50 to upper frame front rail portion 23. The bottom two free arms 40b are pivotally connected by T-shaped clamps 50 one to lower frame portion 33 between rounded corner 33a and lower frame member 39, and the other to frame portion 33 between rounded corner 33b and frame member 40. Interconnecting cross-bar 40c includes a second connector means, such as apertured stub 40d, for attachment of hitch assembly 70.

Likewise, the generally identical rear H-shaped support member 41 is pivotally coupled intermediate upper frame member 20 and lower frame 30 at the rear of the cargo enclosure. The top two arms 41a are pivotally connected by T-shaped clamps 50 to upper frame rear rail portion 24, and its bottom two arms 41b pivotally connected by T-shaped clamps 50, one to lower frame portion 34a and one to frame portion 34b.

Figure 4:
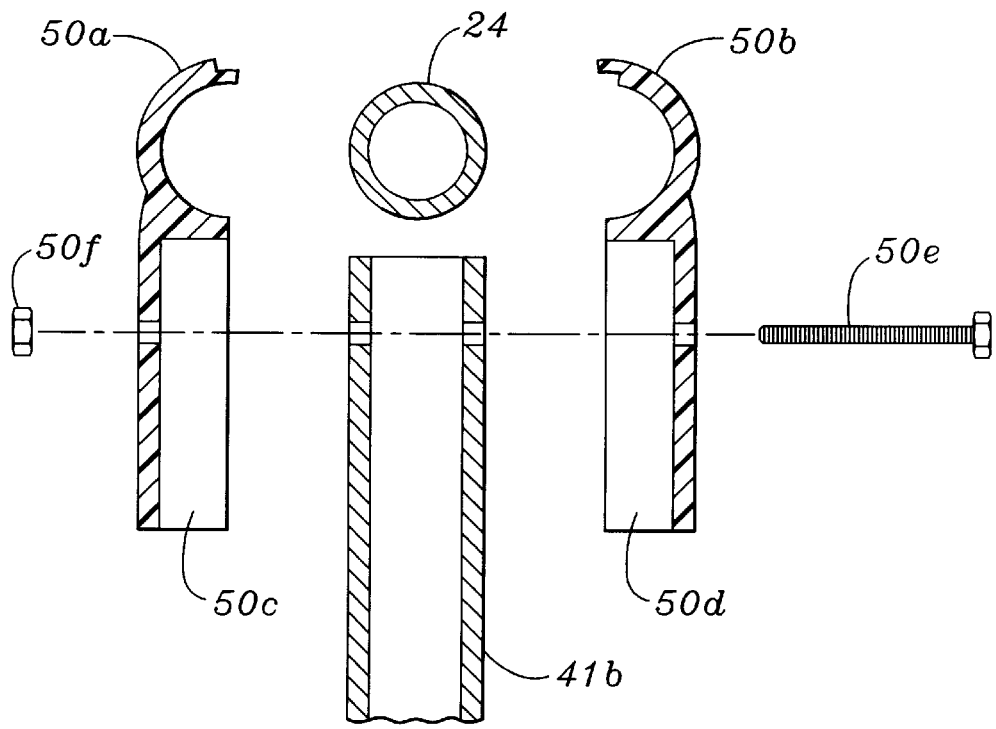
FIG. 4 is an exploded view of the sectional view of the collapsible trailer framing structure of FIG. 1 taken along the lines 4—4 of FIG. 3.

FIG. 4 is an exploded sectional view of T-shaped clamp 50. The clamp 50 is formed of two mirror image parts, each having crossbar, or in-line portions 50a, 50b and stem portions 50c, 50d. In-line portions 50a, 50b are configured for matingly enclosing tubing therethrough, the inside diameter of the mated portions being slightly greater that the enclosed tubing to permit pivoting of the clamp about the enclosed tubing. Stem portions 50c, 50d are configured for matingly receiving tubing 41b therein, portions 50c and 50d fixedly retaining tubing 41b by attachment means such as screw and nut 50e, 50f, respectively. Angled clamps 49 are similarly constructed except that the stem portion is angled from the in-line portion.

Figure 5:
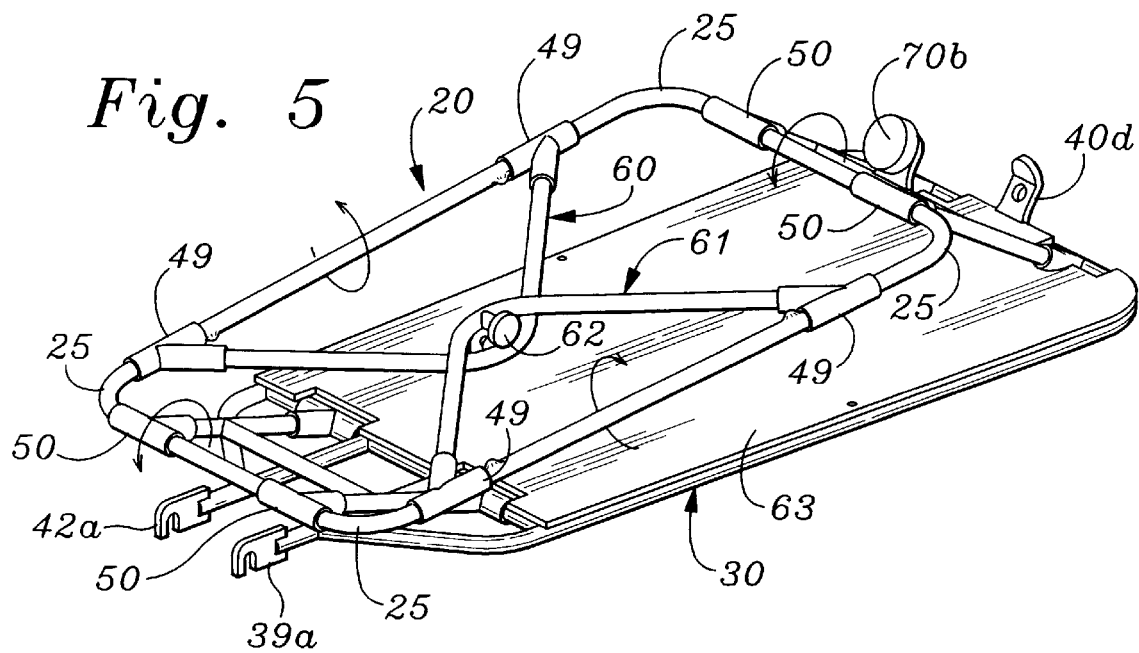
FIG. 5 is a perspective view of the tubular framing structure of the trailer of FIG. 1 in the completion stage of folding for storage or transport with the hitch arms and wheel removed, the tubular sides of the trailer rotated to the folding position, and upper frame member rearwardly depressed by pivoting of the front and rear frame members.

FIGS. 3 and 5 show the frame structure in two positions during collapse, or folding, the wheel and hitch assembly having been removed. As best shown in FIG. 3, the couplers 62 (one shown) have been released and the side support members 60, 61 folded inwardly and upwardly by pivoting of clamps 49 in the directions shown about rails 21 and 22. As shown in FIG. 5, the front and rear H-shaped members 40, 41 have been pivoted by means of T-shaped clamps 50 to fold the upper frame member 20 rearwardly and downwardly in the directions shown to fully collapse the trailer with the upper frame member 20 generally overlying the lower frame member 30.

Hitch assembly 70 is formed of tubular material and includes a hollow portion 70a configured for fitting between the apertured stubs 33d, 40d, portion 70a configured for receiving therethrough a rod (not shown) having thumb screw head 70b and a threaded end for threadable attachment to threaded stub 33d. Portion 70a has welded thereto U-shaped member 70d proximate the top end thereof and member 70c proximate the bottom thereof, the open ends of member 70d attached to a respective side of the axle of the bicycle rear wheel, and the open ends of member 70c welded to member 70d as support arms.

The construction of the trailer is substantially of aluminum tubing, primarily of one diameter, thus effecting economies of assembly. Furthermore, with the primary exception of the hinge assembly and rounded corners of the upper and lower frames, the other tubular stock consists of straight lengths of material. In use, the trailer 30 is stable and efficient.

While the description of the trailer 10 has utilized directional references, such as up, down, right, left, clockwise, rearwardly, etc., is it to be understood that these terms are utilized with reference to the orientations in the figures and are not intended to be limiting. The construction of the trailer 10 is of aluminum tubing which, with the exception of angle-shaped interconnectors 49 and T-shaped interconnectors 52, are all of the same diameter, thus effecting economies of fabrication. In addition, the pivotal interconnectors 49, 50 are formed of injected plastic of wall thickness sufficient to provide stability at the points of connection, and as pivot axes are dimensioned and configured for providing support in the lengthwise direction of the tubes connected.

While there has been shown and described a preferred embodiment, other adaptations and modifications may be made without departing from the spirit and scope of the invention.

What is claimed is:

1. A folding trailer comprising:

an upper generally rectangular structural frame member defining the upper limit of a cargo compartment;

a lower continuous frame member having a substantially rectangular portion complementary to said upper frame member defining a lower limit of said cargo compartment;

a pair of substantially identical folding side support frame members connected intermediate said upper and said lower frame members;

front and rear folding support frame members connected intermediate said upper and said lower frame members at the front and rear ends thereof;

said side frame members and said front and rear frame members including pivot means for providing that said upper frame member is foldable from an extended position to a collapsed position allowing the upper frame member to fold downwardly to overly said lower frame member into a compact configuration; and wherein said substantially identical side frame members include a top portion pivotally connected to said upper frame member and a bottom portion releasably connected to said lower frame member whereby upon release from said lower frame assembly said side members are foldable inwardly and upwardly to a position generally parallel with said upper frame member.

2. The trailer according to claim 1 further including means on said lower frame member for supporting a wheel at the rear end thereof.

3. The trailer according to claim 2 further including hitch means coupled to the front of said trailer for attachment to a towing vehicle.

4. The trailer according to claim 1 wherein said upper frame member is continuous and said upper and lower frame members, said side frame members, and said front and rear frame members are formed from tubular aluminum of the same diameter.

5. The trailer according to claim 1 wherein said front and rear frame members have top and bottom portions pivotally connected to said upper frame member and to said lower frame member whereby upon upward folding of said side members said upper frame member is foldable from an extended position to a collapsed position allowing said upper frame member to collapse to overly said lower frame member into a compact configuration.

6. The trailer according to claim 5 wherein the pivot means of said front and rear frame members include T-shaped clamps having an in-line portion configured for pivotal connection to said upper and lower frame members and a depending stem portion fixedly connected to said front and rear frame members.

7. The trailer according to claim 5 wherein the pivot means of said side frame members include angle-shaped clamps having an in-line portion configured for pivotal connection to said upper and lower frame members and a stem portion depending angularly from said in-line portion and fixedly connected to said side members.

8. A folding trailer comprising:
  upper and lower frame members each defining upper and lower limits of a cargo compartment;
  front and rear support frame members connected intermediate said upper and said lower frame members defining the front and rear of said cargo compartment, each said front and rear member having a top portion pivotally connected to the respective end of said upper frame member and a bottom portion pivotally connected to the corresponding end of said lower frame member;
  side frame members connected intermediate said upper and said lower frame members defining the sides of said cargo compartment, each said side member having a top portion pivotally connected to the respective side of said upper frame member and a bottom portion releasably connected to the corresponding side of said lower frame member; and
  whereby upon release from said lower frame assembly said side members are foldable inwardly and upwardly to a position parallel with said upper frame member; and said upper frame member is foldable from an extended position to a collapsed position to overly said lower frame member into a compact configuration.

9. The trailer according to claim 8 wherein said upper frame member is continuous and substantially rectangular in plan view.

10. The trailer of claim 9 wherein said upper and lower frame members, said side frame members, and said folding frame members are formed from tubular aluminum of the same diameter.

11. The trailer according to claim 8 further including hitch means coupled to the front of said trailer for attachment to a towing vehicle.

12. A folding trailer comprising:
  an upper elongate frame member having a front end and a rear end and defining an upper limit of a cargo compartment;
  a lower frame member having a portion thereof defining a lower limit of said cargo compartment, said portion having a front end and a rear end;
  folding front and rear support frame members connected intermediate said upper and said lower frame members defining the front and rear of said cargo compartment, each said front and rear member having a top portion and a bottom portion, the top portion of each pivotally connected to the respective end of said upper frame member and the bottom portion of each pivotally connected to the corresponding end of said lower frame member;
  folding side frame members connected intermediate said upper and said lower frame members defining the sides of said cargo compartment, each said side member having a top portion and a bottom portion, the top portion of each pivotally connected to the respective side of said upper frame member and the bottom portion of each releasably connected to the corresponding side of said lower frame member;
  said side members and said front and rear folding frame members including pivot points such that upon release of said bottom portions of said side members, said upper frame member is foldable from an extended position to a collapsed position allowing said upper frame member to collapse to overly said lower frame member into a compact configuration;
  means extending rearwardly of said lower frame member for supporting a wheel; and wherein said front and rear folding frame members are comprised of H-shaped support frames pivotally coupling said upper and said lower frame members at respective ends, said H-shaped support frames including first and second upright side tubes and an interconnecting cross-tube, the top two upright tubes in each case pivotally connected to said upper frame and the bottom two upright tubes pivotally connected to said lower frame portion.

13. The trailer according to claim 12 wherein said H-shaped frames are pivotally connected to said upper and lower frame members by T-shaped clamps having an in-line portion configured for pivotal connection to said upper and lower frame and a stem portion configured for fixed attached to said upright side tubes.

14. The trailer according to claim 12 wherein said side support folding frame members are comprised of a length of tubing bent into a generally right angle configuration having a rounded right angle portion and substantially equal adjacent legs, the legs of said adjacent sides pivotally connected by angle-shaped clamps to a respective side of said upper frame member, and said rounded right angle portion releasably connected to said lower frame member.

15. The trailer according to claim 14 wherein said angle-shaped clamps each have a in-line portion configured for pivotal connection to a respective side of said upper frame member and a stem portion depending at an angle from said in-line portion, said stem portion fixedly connected to a respective adjacent leg.

16. A folding trailer comprising:
  an upper generally rectangular structural frame member defining the upper limit of a cargo compartment;
  a lower continuous frame member having a substantially rectangular portion complementary to said upper frame member defining a lower limit of said cargo compartment;
  a pair of substantially identical folding side support frame members connected intermediate said upper and said lower frame members;

front and rear folding support frame members connected intermediate said upper and said lower frame members at the front and rear ends thereof;

said side frame members and said front and rear frame members including pivot means for providing that said upper frame member is foldable from an extended position to a collapsed position allowing the upper frame member to fold downwardly to overly said lower frame member into a compact configuration; and wherein the front of said lower frame and said front support frame support member each include connector means for attachment of said hitch means, said hitch means formed of tubular material and including a hollow portion configured for fitting between said connector means for receiving therethrough a rod having a thumb screw head and a threaded end for threadable attachment to the connector means of the lower frame, said hollow portion having welded thereto the curved portion of a first U-shaped member proximate the top end thereof and the curved portion of a second U-shaped member proximate the bottom thereof, the open ends of said first U-shaped member attached to a respective side of the axle of the bicycle rear wheel, and the open ends of said second U-shaped member welded to said first U-shaped member proximate said axle.

17. A folding trailer comprising:

an upper elongate frame member having a front rail, a rear rail, and two substantially identical side rails and defining an upper limit of a cargo compartment;

a lower frame member having a portion thereof defining a lower limit of said cargo compartment complementary with said upper frame member and having a front rail, a rear rail, and two substantially identical side rails;

a pair of folding side frame members connected intermediate said upper and said lower frame members, each of said side members pivotally connected to a respective side rail of said upper frame member and releasably connected to the corresponding side rail of said lower frame member whereby upon release from said lower frame member said side frame members are foldable inwardly and upwardly to a position generally parallel with the plane of said upper frame member;

front and rear folding frame members connected intermediate said upper and said lower frame members, each having a top end and a bottom end, the top end of said front member pivotally connected to the front rail of said upper frame and the bottom end pivotally connected to the front rail of said lower frame member, and the top end of said rear frame member pivotally connected to the rear rail of said upper frame and the bottom end pivotally connected to the rear rail of said lower frame member;

said front and rear folding frame members including pivot means for providing that upon folding of said side members to a position generally parellel with the plane of said upper frame member said upper frame member is foldable from an extended position to a collapsed position allowing the upper frame member to fold downwardly and rearwardly to overly said lower frame member into a compact configuration; and means on said lower frame member for supporting a wheel at the rear end thereof.

18. The trailer according to claim 17 further including hitch means coupled to the front of said trailer for attachment to a towing vehicle.

19. A folding trailer comprising:

upper and lower frame members;

front, rear and side support frame members; said side frame members including a top portion having pivot means for pivotally connecting to said upper frame member and a bottom portion releasably connected to said lower frame member whereby upon release from said lower frame assembly said side members are foldable inwardly and upwardly to a position generally parallel with said upper frame member; and wherein said front and rear frame members have top and bottom portions pivotally connected to said upper frame member and to said lower frame member whereby upon upward folding of said side members said upper frame member is foldable from an extended position to a collapsed position allowing said upper frame member to collapse to overly said lower frame member into a compact configuration.

20. The trailer according to claim 19 wherein said front and rear folding frame members are comprised of H-shaped support frames having pivot means for pivotally coupling said upper and lower frame members at respective ends, and include first and second upright side tubes and an interconnecting cross-tube where the top portions of said upright tubes in each case are pivotally connected to said upper frame and the bottom portions of said upright tubes in each case are connected pivotally to said lower frame portion.

21. The trailer according to claim 20 wherein said pivot means of said front and rear frame members include T-shaped clamps having an in-line portion configured for pivotal connection to said upper and lower frame members and a depending stem portion fixedly connected to said front and rear frame members.

22. The trailer according to claim 19 wherein said pivot means of said side frame members include angle-shaped clamps having an in-line portion configured for pivotal connection to said upper and lower frame members and a stem portion depending angularly from said in-line portion and fixedly connected to said side members.

23. The trailer according to claim 19 further including means on said lower frame member for supporting a wheel at the rear end thereof and hitch means coupled to the front of said trailer for attachment to a towing vehicle.

* * * * *